United States Patent [19]

Corretjer et al.

[11] Patent Number: 5,864,799
[45] Date of Patent: Jan. 26, 1999

[54] APPARATUS AND METHOD FOR GENERATING NOISE IN A DIGITAL RECEIVER

[75] Inventors: Jesus Francisco Corretjer, Grayslake; Paul Royer, Prospect Heights; David Grant Cason, Palatine; Juan Ramon Uribe, Des Plaines, all of Ill.

[73] Assignee: Motorola Inc., Schaumburg, Ill.

[21] Appl. No.: 694,079

[22] Filed: Aug. 8, 1996

[51] Int. Cl.⁶ .................................................. G10L 3/00
[52] U.S. Cl. ........................................ 704/228; 704/233
[58] Field of Search .................................. 455/222, 296; 379/61; 395/2.35, 2.42; 704/228, 227, 226, 200, 233, 207; 375/228, 351

[56] References Cited

U.S. PATENT DOCUMENTS

| | | | |
|---|---|---|---|
| 4,839,906 | 6/1989 | Leveque et al. | 375/37 |
| 4,933,973 | 6/1990 | Porter | 704/233 |
| 5,113,400 | 5/1992 | Gould et al. | 371/43 |
| 5,293,449 | 3/1994 | Tzeng | 704/223 |
| 5,327,457 | 7/1994 | Leopold | 375/228 |
| 5,430,894 | 7/1995 | Nohara et al. | 455/296 |
| 5,577,076 | 11/1996 | Sato et al. | 375/346 |
| 5,592,587 | 1/1997 | Kunoff et al. | 395/2.73 |
| 5,625,687 | 4/1997 | Sayre, III | 379/416 |

FOREIGN PATENT DOCUMENTS

| | | |
|---|---|---|
| 0464911A2 | 8/1992 | European Pat. Off. . |
| 6-77891 | 3/1994 | Japan ............... H04B 7/26 |
| 2307623 | 5/1997 | United Kingdom . |

OTHER PUBLICATIONS

"Fixed–point DSP chip can generate real–time random noise," by Bill Salibrici, TeleSciences Co. Systems, EDN, Apr. 29, 1993, pp.119–122.

"Personal Digital Cellular Telecommunication System RCR Standard," RCR Std–27C, issued Apr. 30th, 1991, Revision C Nov. 10th, 1994, pp.666–667.

*Primary Examiner*—Richemond Dorvil
*Attorney, Agent, or Firm*—Mark D. Patrick

[57] ABSTRACT

A digital receiver (114) converts a received signal into a speech signal. The digital receiver (114) includes circuitry (128) and a noise generator (130). The circuitry (128) generates an error signal indicative of a quality level of the received signal. The noise generator (130), responsive to receiving the error signal, selectively inserts noise into the speech signal.

20 Claims, 4 Drawing Sheets

APPARATUS AND METHOD FOR GENERATING NOISE IN A DIGITAL RECEIVER

FIELD OF THE INVENTION

The present invention relates generally to digital receivers and, more specifically, to generating noise in a digital receiver.

BACKGROUND OF THE INVENTION

Digital cellular telephones permit telephonic communication between users thereof. Digital cellular telephones employ a digital receiver that receives radio frequency (RF) signals and converts the RF signals to extract a data signal. The data signal is supplied to a vocoder which decodes the data signal, generates a speech signal therefrom, and outputs the speech signal for use by a user. RF signals may become corrupted prior to, and during, reception. Corrupted RF signals may result in a corrupted data signal and a severely degraded speech signal.

The digital data signal extracted by the digital receiver, by its nature, lacks background noise unlike that present in traditional analog receivers. As such, a traditional digital receiver does not produce noise in association with a corrupted speech signal. Traditional digital receivers alert the user to corrupted speech by letting the user hear distorted speech, issuing a special bad reception tone, or muting the speech. In these instances, the user can not tell if telephonic communication has ended, the receiver has become inoperative, the antenna of the telephone needs reorienting, or the like.

A better approach to alerting the user of a digital receiver to corrupted speech is disclosed in U.S. Pat. No. 5,327,457 by Leopold, assigned to Motorola Inc. In U.S. Pat. No. 5,327,457, a background noise signal is generated based on a low signal level of received RF signals. The background noise signal is added to the speech signal to improve user ambiance by making the digital receiver sound more like analog receivers with which users are more familiar. However, signal level is not always the best indicator that speech will be corrupted. For example, interference can cause corruption in receive RF signals without reducing signal level.

Therefore, it would be beneficial to carry the concept of U.S. Pat. No. 5,327,457 further by providing an improved apparatus and method for generating noise in a digital receiver.

DETAILED DESCRIPTION OF THE PREFERRED EMBODIMENTS

A digital receiver converts a received signal into a speech signal. The circuitry generates an error signal indicative of a quality level of the received signal. The noise generator, responsive to receiving the error signal, selectively inserts noise into the speech signal. By basing noise insertion on the accuracy of the received signal, noise can be inserted into the speech signal only when the received signal is found to be corrupted (i.e., the received signal is at a low quality level) such that the user will be subjected to degraded or muted speech.

Figure 1:
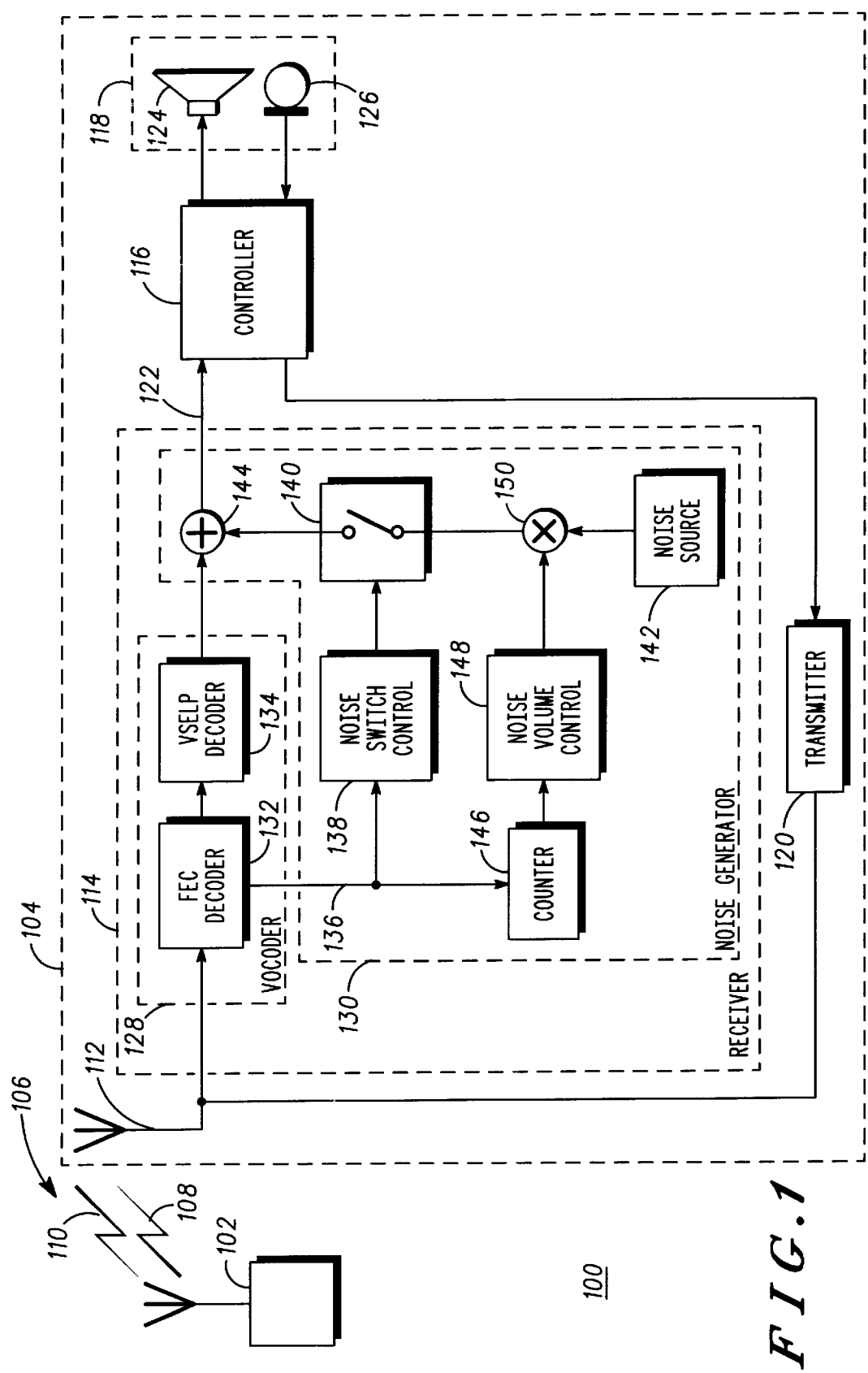
FIG. 1 is a block diagram illustrating a digital communication system employing a digital communication device having a noise generator.

FIG. 1 illustrates a digital communication system 100. The digital communication system 100 includes communication devices 102 and 104 that communicate over a communication link 106. Communication devices 102 and 104 can be two-way radios, cellular telephones, cordless telephones, radios, base stations, radio transmitters, personal digital assistants, modems, land line telephones, or the like. The communication link 106 can be a wireless connection, a wireline connection such as a twisted wire pair or a coaxial cable, or the like. In the illustrated embodiment, the digital communication system 100 is a digital cellular telephone system employing TDMA (Time Division Multiple Access), CDMA (Code Division Multiple Access), or the like. The illustrated communication device 102 is a cellular base station and the illustrated communication device 104 is a digital cellular telephone compatible with communication device 102. In the illustrated embodiment, communication link 106 comprises a downlink radio frequency (RF) signal 108 and an uplink RF signal 110.

The communication device 104 includes an antenna 112, a receiver 114, a controller 116, a user interface 118, and a transmitter 120. The antenna 112 couples the downlink RF signal 108 into the receiver 114 for demodulation and decoding into a received speech signal on line 122. The controller 116 couples the received speech signal to the user interface 118 where it is transduced by a speaker 124 into outgoing audible signals discernible by a user. Incoming audible signals provided by a user are transduced via a microphone 126 of the user interface 118 and coupled to the transmitter 120 as a transmit speech signal via the user interface 118 and the controller 116. The transmitter 120 encodes and modulates the transmit speech signal for emission by the antenna 112 as the uplink RF signal 110.

The receiver 114 includes a vocoder 128 and a noise generator 130. The vocoder 128 and the noise generator 130 are implemented using a single digital signal processor (DSP) chip, such as the DSP56000 manufactured and sold by Motorola, Inc., or using one or more suitable microprocessors or microcontrollers. However, it will be recognized that the vocoder 128 and the noise generator 130 could instead be implemented wholly or partially as discrete components.

Figure 2:
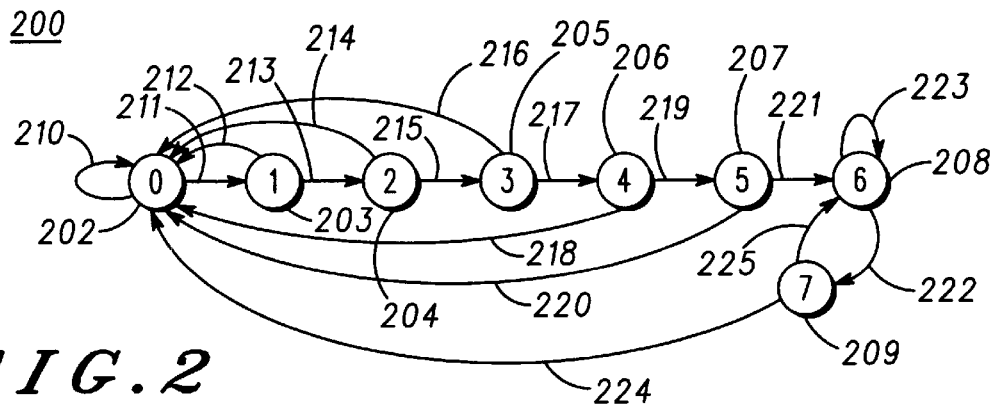
FIG. 2 is a known state diagram illustrating operation of a decoder block of the digital communication device of FIG. 1.

The vocoder 128 includes decoding circuitry comprising a forward error correction (FEC) decoder 132 and a vector sum excited linear prediction (VSELP) decoder 134. The FEC decoder 132 receives demodulated data of the downlink RF signal 108 at an input thereof and decodes the demodulated data into consecutive decoded frames of speech data according to a known decoding algorithm, such as a Viterbi algorithm. The FEC decoder 132 determines the quality level of each decoded frame of speech data by conducting a cyclic redundancy check (CRC) operation, such as that described in section 5.1.3.3 of Research and Development Center for Radio Systems Standard 27C (RCR STD-27C). The CRC operation detects bit errors in a portion of each decoded frame of speech data. Bit errors result from corruption of the downlink RF signal 108 that is not correctable by the decoding circuitry. Use of data from a corrupted downlink RF signal 108 causes severe degradation to the quality of the received speech signal. To prevent degradation to speech quality, the FEC decoder 132, responsive to the CRC, employs a bad frame masking state machine 200 (FIG. 2).

The bad frame masking state machine 200, also described in section 5.1.3.4 of RCR STD-27C, has error states 0–7, represented by blocks 202–209, respectively. The error states 0–7 represent levels of quality of the decoded frame of speech data. Transitions among the error states 0–7 are represented by the arrows 210–225 connecting the blocks 202–209. A transition via one of the arrows 210–225 occurs for each decoded frame of speech data.

The bad frame masking state machine 200 begins at error state 0 (block 202). If no error is detected in the decoded frame of speech data, the bad frame masking state machine 200 remains at error state 0 (block 202), as represented by arrow 210. For each successive decoded frame of speech data in which an error is detected, the bad frame masking state machine 200 moves to the next higher numbered one of the error states 1 (block 203), 2 (block 204), 3 (block 205), 4 (block 206), 5 (block 207), and 6 (block 208), as represented by arrow 211, 213, 215, 217, 219, and 221, respectively. The error state number is thus the number of successive decoded frames in which an error is detected.

When a decoded frame is detected that does not include an error, the bad frame masking state machine 200 moves to a lower error state. The bad frame masking state machine 200 moves to error state 0 (block 202) from error state 1 (block 203), error state 2 (block 204), error state 3 (block 205), error state 4 (block 206), or error state 5 (block 207), as represented by arrow 212, 214, 216, 218, or 220, respectively, upon the occurrence of one decoded frame with no error detected.

The bad frame masking state machine 200 remains in error state 6 (block 208), represented by arrow 223, upon the occurrence of additional decoded frames including an error. Upon the occurrence of one decoded frame with no error, the bad frame masking state machine 200 moves from error state 6 (block 208) to error state 7 (block 209), as represented by arrow 222. Upon the occurrence of a decoded frame with an error while in error state 7 (block 209), the bad frame masking state machine 200 moves to error state 6 (block 208), as represented by arrow 225. If in error state 7 (block 209) and an errorless decoded frame occurs, the bad frame masking state machine 200 moves from error state 7 (block 209) to error state 0 (202), as represented by arrow 224.

At the conclusion of each transition, the FEC decoder 132 acts on the decoded frame of speech data according to a resulting one of the error states 0–7 (blocks 202–209). If the resulting error state is error state 0 (block 202), the quality of the decoded frame of speech data is at a highest level and no action is taken by the FEC decoder 132 on the decoded frame of speech data. If the resulting error state is error state 1 (block 203) or error state 2 (block 204), the quality of the decoded frame of speech data is at a lower level and the FEC decoder 132 replaces the bits with errors of the decoded frame of speech data with corresponding bits from the most previous decoded frame of speech data that had a resulting error state of error state 0. If the resulting error state is error state 3 (block 205), error state 4 (block 206), or error state 5 (block 207), the quality of the decoded frame of speech data is at an even lower level and the FEC decoder 132 attenuates the decoded frame of speech data. If the resulting error state is error state 6 (block 208) or error state 7 (block 209), the quality of the decoded frame of speech data is at a lowest level and the FEC decoder 132 mutes the decoded frame of speech data. Next, the FEC decoder 132 outputs the decoded frame of speech data to the VSELP decoder 134 (FIG. 1). The VSELP decoder 134 generates the received speech signal on line 122 from the decoded frame of speech data. Muted speech data in the decoded frame of speech data creates audio voids in the received speech signal. A user listening at the speaker 124 is likely to believe that the voids in the speech indicate inoperability of the communication device 104.

To dispel these beliefs, at the end of each transition of the bad frame masking state machine 200, the FEC decoder 132 outputs an error signal on line 136. The error signal comprises the resulting error state for the decoded frame of speech data. The noise generator 130, responsive to the error signal, inserts noise into the received speech signal. The propagation delay through the noise generator 130 is approximately equal to that through the VSELP decoder 134. This ensures that the noise is inserted into the speech signal generated from the decoded frame of speech data containing the error.

The noise generator 130 comprises a noise switch control 138, a switch 140, a noise source 142, and an adder 144. The noise switch control 138 is coupled to the FEC decoder 132 via line 136 to receive the error signal. The noise switch control 138, responsive to the error signal, outputs a control signal. The switch 140 is coupled to the noise switch control 138, the noise source 142, and the adder 144. The switch 140, in response to the control signal, selectively opens to disconnect the noise source 142 from the adder 144 or selectively closes to connect the noise source 142 to the adder 144. The noise source 142 outputs noise samples to the switch 140. The noise samples are generated from real-time, pseudorandom, uniformly or Gaussian-distributed signals having a frequency spectrum such that the amplitude is flat within a voice range, such as 300 Hz to 3500 Hz. In the illustrated embodiment, the noise samples are white noise samples. White noise is preferred because of its spectral flatness and smooth sounding characteristics. However, it will be recognized that other types of noise or alerts may alternatively be used. The adder 144 is further coupled to line 122. The adder 144 adds signals provided by the switch 140 to the received speech signal from the vocoder 128. Thus, the adder 144 adds the noise output by the noise source 142 to the received speech signal when the switch is closed and, alternatively, the adder 144 does not add a signal to the received speech signal when the switch 140 is open.

Figure 3:
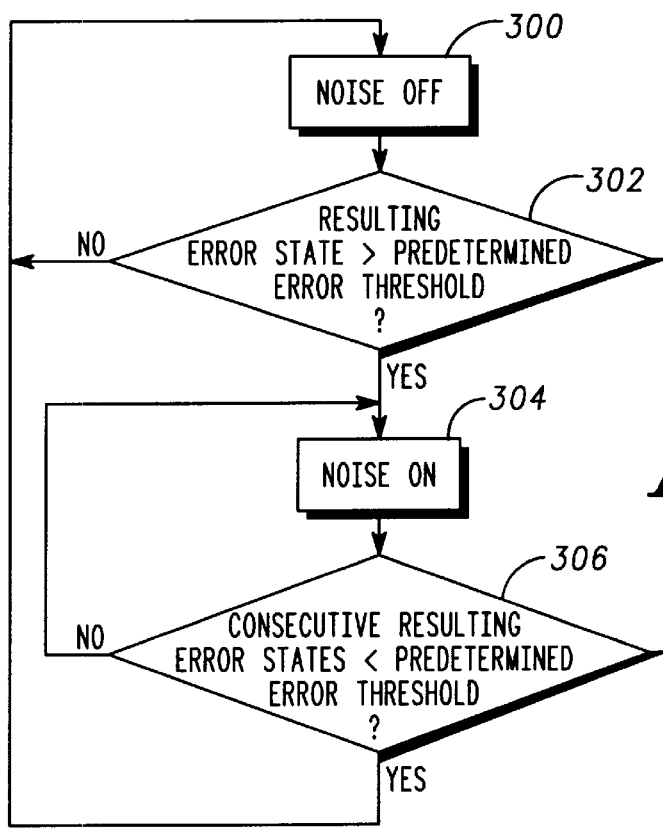
FIG. 3 is a flow chart illustrating operation of a noise switch control of the noise generator of FIG. 1.

The specific operation of the noise switch control 138 is shown in FIG. 3. Initially, the noise switch control 138 outputs the control signal to open the switch 140 and prevent noise from being added to the received speech signal (at block 300). The noise remains "off" (at block 300) until the noise switch control 138 detects a resulting error state of the error signal that exceeds a predetermined error threshold (at block 302). In the illustrated embodiment, the predetermined error threshold is 3 and is exceeded by an error signal having a resulting error state of 4, 5, 6, or 7. Once an error signal of error state 4, 5, 6, or 7 is detected, the noise switch control 138 outputs the control signal to close the switch 140 and add noise to the received speech signal (at block 304). The noise remains "on" (at block 304) until the noise switch control 138 detects a predetermined number of consecutive error signals having a resulting error state that is below the predetermined error threshold (at block 306). In the illustrated embodiment, the noise switch control 138 must detect only resulting error states of 0, 1, or 2 in 250 consecutive error signals (each error signal representing a respective consecutive decoded frame). Once this consecutive number of error signals is detected, the operation of the noise switch control 138 returns to block 300.

To control the volume of the noise inserted into the received speech signal, the noise generator 130 (FIG. 1) can further include a counter 146, a noise volume control 148, and a mixer 150. The counter 146 is coupled to the FEC decoder 132 via line 136 to receive the error signal with the resulting error state. The counter 146 determines how many times each of the different resulting error states occurs during a predetermined number of decoded frames. The noise volume control 148 is coupled to the counter 146 and receives counts of the different resulting error states. The noise volume control 148, according to the counts, selectively varies the volume level of the noise by outputting a noise scale factor. The mixer 150 is coupled to the noise volume control 148, the noise source 142, and the switch 140. The mixer 150 multiplies the noise scale factor with the noise output by the noise source 142. This increases or decreases the amplitude, or volume, of the noise that is provided to the switch 140. The numerically larger the noise scale factor, the higher the amplitude of the noise and, thus, the higher the volume of the noise in the speech signal at the speaker 124. Because the resulting error states are related to the quality of the received signal and the noise volume control 148 controls the volume based on the resulting error states, the noise level provides feedback to the user of the quality of the received signal.

Figure 4:
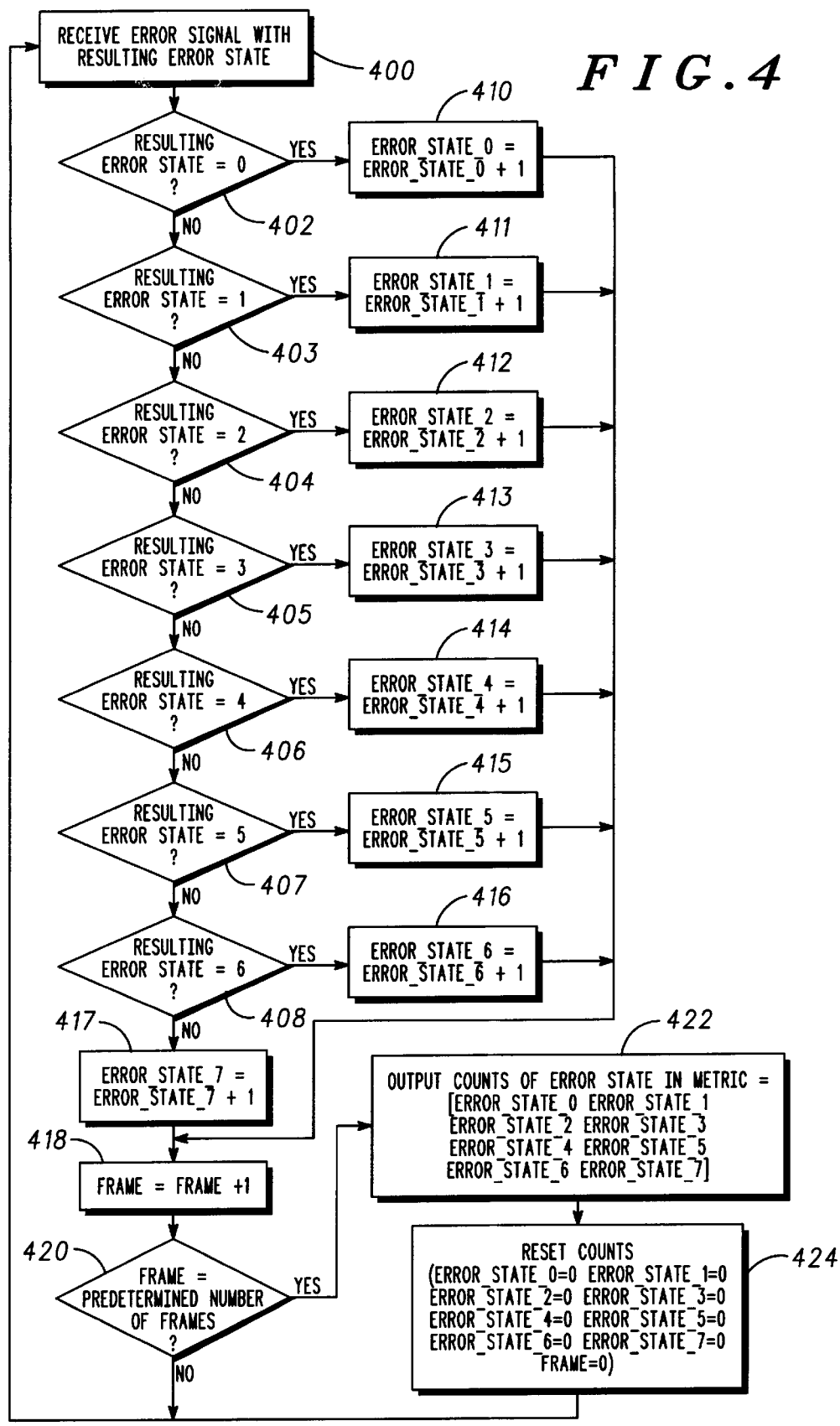
FIG. 4 is a flow chart illustrating operation of a counter of the noise generator of FIG. 1.

The specific operation of the counter 146 is shown in FIG. 4. The counter 146 receives the error signal indicating the resulting error state (at block 400). The counter 146 detects which of the resulting error states comprises the error signal (at blocks 402–408) and increments a corresponding count (at blocks 410–417). The counter 146 increments a frame count (at block 418) and determines if the frame count has reached a predetermined number of frames (at block 420). In the illustrated embodiment, the predetermined number of frames is 200 successive decoded frames. If the predetermined number of decoded frames has not occurred, the counter 146 returns to block 400 to receive the next error signal. If the predetermined number of decoded frames has occurred, the counter 146 outputs the counts of each of the error states for the previous predetermined number of decoded frames in the form of a metric (at block 422). In the illustrated embodiment, the metric comprises a one-dimensional array wherein the counts of the resulting error state 0 are in location 1, 1; the counts of resulting error state 1 are in location 1, 2; the counts of resulting error state 2 are in location 1, 3; the counts of resulting error state 3 are in location 1, 4; the counts of resulting error state 4 are in location 1, 5; the counts of resulting error state 5 are in location 1, 6; the counts of resulting error state 6 are in location 1, 7; and the counts of resulting error state 7 are in location 1, 8. For example, at the conclusion of 200 successive decoded frames, a metric of [160 20 6 6 4 2 1 1] would be output for the occurrence of 160 error signals with resulting error state 0, 20 error signals with resulting error state 1, 6 error signals with resulting error state 2, 6 error signals with resulting error state 3, 4 error signals with resulting error state 4, 2 error signals with resulting error state 5, 1 error signal with resulting error state 6, and 1 error signal with resulting error state 7. Once the metric is output, the counter 146 resets the error state and the frame counts (at block 424) and returns to block 400 to receive the next error signal associated with the next decoded frame.

Figure 5:
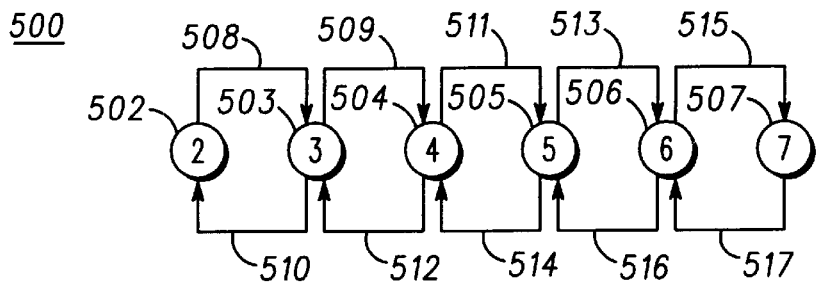
FIG. 5 is a state diagram illustrating operation of a noise volume control of the noise generator of FIG. 1.
Figure 6:
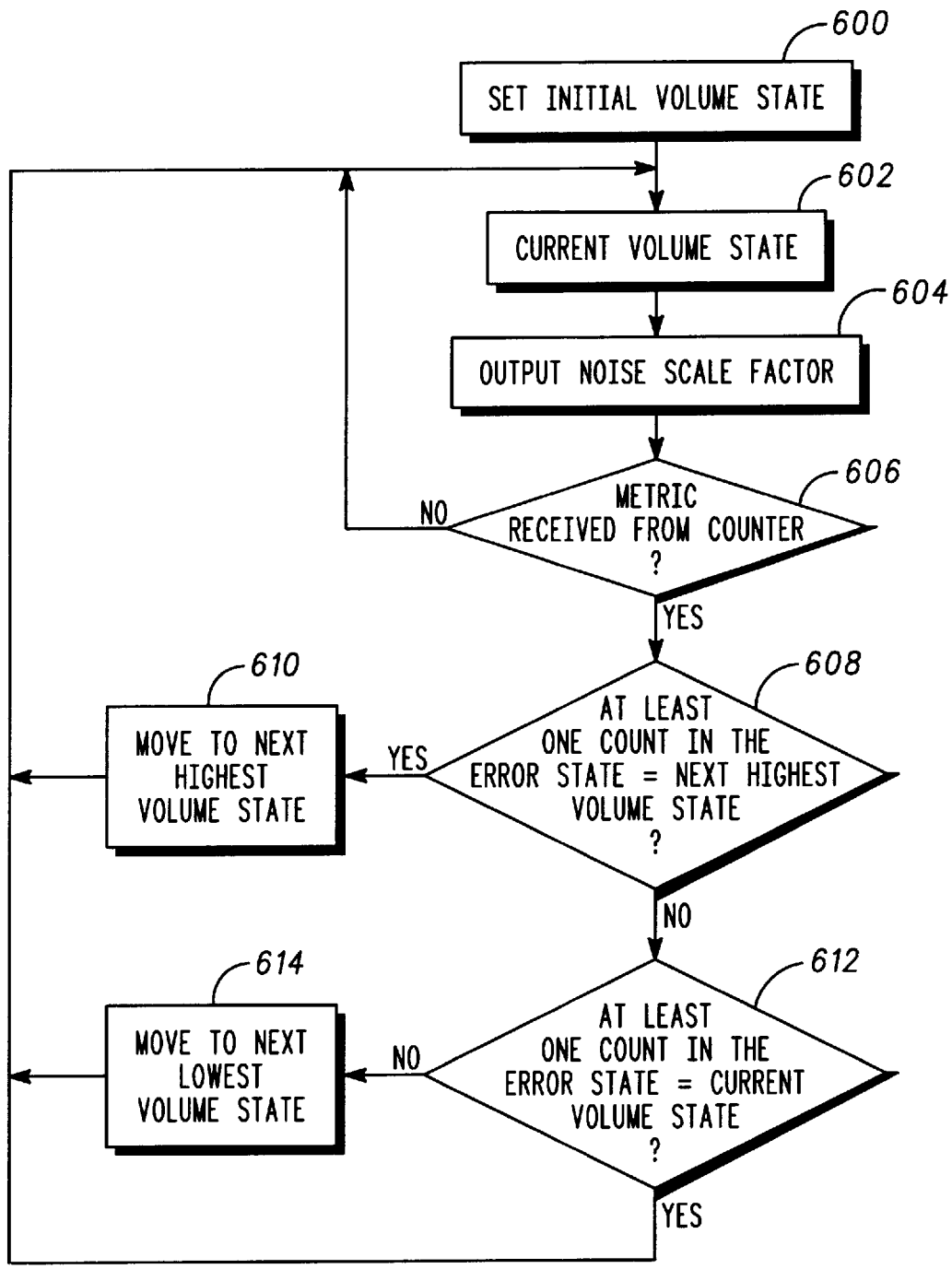
FIG. 6 is a flow chart illustrating operation of the noise volume control of the noise generator of FIG. 1.

The specific operation of the noise volume control 148 is shown in FIGS. 5 and 6. The noise volume control 148 employs a volume control state machine 500. The volume control state machine 500 comprises volume states 2–7, represented by blocks 502–507, respectively. The volume states numerically correspond to the error states in the metric output by the counter 146. In the illustrated embodiment, volume states 2–7 correspond to resulting error states 2–7, respectively. Each volume state corresponds to a noise scale factor output to the mixer 150. In the illustrated embodiment, the noise scale factors corresponding to volume states 2, 3, 4, 5, 6, and 7 (blocks 502, 503, 504, 505, 506, and 507) are approximately 0, 0.005, 0.008, 0.013, 0.018, and 0.023, respectively. Transitions among the volume states 2–7 (blocks 502–507) are represented by arrows 508–517. Transitions can occur after every reception of the metric from the counter 146.

The noise volume control 148 initially sets the volume control state machine 500 to a current volume state (at blocks 600 and 602). In the illustrated embodiment, the volume control state machine 500 is initially set to the volume state 2 (block 502). However, it will be recognized that the volume control state machine 500 could initially be set to any of the other volume states. The noise volume control 148 outputs a noise scale factor corresponding to the current volume state (at block 604). The noise volume control 148 remains in the current volume state (i.e., volume state 2 (block 502)) until the metric is received from the counter 146 (at block 606).

The noise volume control 148 examines the metric to determine if the metric contains at least one count in an error state that is numerically equal to the next highest volume state (i.e., equal to the current volume state +1) (at block 608). If so, the volume control state machine 500 moves from the current volume state to the next highest volume state (at block 610). The noise volume control 148 returns to block 602 where the next highest volume state becomes the current volume state. For example, if the metric is [150 40 7 1 1 1 0 0] and the current volume state is volume state 2 (block 502), the presence of an error in error state 3 will cause the volume control state machine 500 to move to volume state 3 (block 503). In the illustrated embodiment, the possible transitions at block 610 are from volume state 2 (block 502), 3 (block 503), 4 (block 504), 5 (block 505), or 6 (block 506) to volume state 3 (block 503), 4 (block 504), 5 (block 505), 6 (block 506), or 7 (block 507) via arrow 508, 509, 511, 513, or 515, respectively. Volume state 3 will be the current volume state when the noise volume control 148 returns to block 602.

If the metric does not contain at least one count in an error state that is numerically equal to the next highest volume state, the noise volume control 148 examines the metric to determine if the metric contains at least one count in an error state that is numerically equal to the current volume state (at block 612). If not, the volume control state machine 500 moves from the current volume state to the next lowest volume state (at block 614). For example, if the metric is [150 40 5 5 0 0 0 0] and the current volume state is volume state 4 (block 504), the volume control state machine 500 moves to volume state 3 (block 503). In the illustrated embodiment, the possible transitions at block 614 are from volume state 3 (block 503), 4 (block 504), 5 (block 505), 6 (block 506), or 7 (block 507) to volume state 2 (block 502), 3 (block 503), 4 (block 504), 5 (block 505), or 6 (block 506) via arrow 510, 512, 514, 516, or 517, respectively. The noise volume control 148 returns to block 602 where the next lowest volume state becomes the current volume state.

If the metric does include at least one count in an error state that is numerically equal to the current volume state, the noise volume control 148 returns to block 602 where the current volume state is maintained. For example, if the current volume state is volume state 4 (block 504), such a metric would be [150 40 5 4 1 0 0 0].

To provide a better sounding noise that best mimics the continuous nature of noise in an analog radio, the noise volume control 148 (at block 604) outputs the current noise scale factor according to a ramping technique. The ramping technique includes gradually increasing or decreasing the noise scale factor when moving between volume states. In the illustrated embodiment, the noise volume control 148 increments or decrements the noise scale factor over a period of 100 decoded frames or 2 secs. in steps defined by the difference between the previous noise scale factor and the current noise scale factor divided by 100. For example, in response to transitioning from volume state 2 where the noise scale factor is 0 to volume state 3 where the noise scale factor is 0.005, the noise volume control 148 incrementally increases the noise scale factor 100 times, by 0.00005 ((0.005–0)/100) each time, over a time period of 2 secs. In response to transitioning from volume state 4 where the noise scale factor is 0.008 to volume state 3 where the noise scale factor is 0.005, the noise volume control 148 incrementally decreases the noise scale factor 100 times, by 0.00003 ((0.008–0.005)/100) each time, over a time period of 2 secs.

Although based on the detection of bit errors, it will be recognized that noise insertion and volume control could alternatively be based on the detection of other vocoder artifacts that affect signal quality. The error signal can alternatively define a measure of phase jitter, timing jitter, eye opening jitter, constellation jitter, signal-to-noise ratio, or other vocoder artifact.

It will be recognized that the error signal need not be generated by the decoding circuitry or solely from the decoded input signal. For example, the error signal could alternatively be generated outside of the decoding circuitry and based on a comparison of a re-encoded decoded receive signal and the actual receive signal based as described in U.S. Pat. No. 5,113,400 entitled "Error Detection System" by Gould et al., which was issued on May 12, 1992 and is assigned to Motorola, Inc.

Thus, it can be seen that noise can be inserted into a corrupted speech signal of a digital receiver to audibly indicate poor reception to the user. A noise generator adds noise to a speech signal based on the quality of the signal received by the digital receiver. In addition, the noise generator can gradually vary the volume of the noise based on further variations of signal quality. As the signal quality decreases, the volume level of the noise is increased. Alternatively, as the signal quality increases, the volume level of the noise is decreased. In one embodiment, the noise generator operates responsive to the decoder and accurately and efficiently inserts noise at an appropriate volume level directly into those frames of the speech signal determined to be corrupted by the decoder.

What is claimed is:

1. A digital receiver for converting a received signal into a speech signal, the digital receiver comprising:
   circuitry to generate an error signal indicative of a quality level of the received signal; and
   a noise generator coupled to an output of the circuitry, the noise generator to insert noise into the speech signal when the quality level of a first occurrence of the error signal is below a predetermined quality threshold and, thereafter, the noise generator to halt insertion of noise into the speech signal only when the quality level of a plurality of occurrences of the error signal are above the predetermined quality threshold.

2. The digital receiver according to claim 1 wherein the circuitry to generate further includes a decoder to decode the received signal into decoded frames of speech data, the decoder to detect bit errors in a current one of the decoded frames of speech data, the decoder employing a state machine having a plurality of error states to track the bit error rate of the decoded frames of speech data, the decoder to generate the error signal based on a current one of the plurality of error states.

3. The digital receiver according to claim 1 wherein
   the error signal indicates one of a high quality level and a low quality level, and
   the noise generator further comprises:
      a noise source to provide the noise,
      a switch coupled to the noise source to selectively connect the noise source to the digital receiver at the speech signal, and
      a noise switch control coupled to the output of the circuitry and the switch, the noise switch control controlling the switch to connect the noise source when the error signal indicates the low quality level and, thereafter, the noise switch control controlling the switch to disconnect the noise source only when a predetermined number of consecutive ones of the error signal indicate the high quality level.

4. The digital receiver according to claim 3 wherein the high quality level is a low bit error rate and the low quality level is a high bit error rate.

5. The digital receiver according to claim 1 wherein the noise generator further comprises:
   a noise source to provide the noise, and
   a noise volume control coupled to the noise source, the noise volume control, responsive to multiple occurrences of the error signal, to selectively vary a volume level of the noise, the volume level corresponding to the quality level of the error signal.

6. The digital receiver according to claim 5 wherein
   the error signal indicates one of a high quality level and a low quality level, and
   the noise generator further comprises a counter having an input coupled to the output of the circuitry and an output coupled to the noise volume control, the counter to count each occurrence of the error signal at one of the high quality level and the low quality level for a predetermined number of the error signal and, thereafter, to output counted occurrences of the error signal at the high quality level and the low quality level.

7. The digital receiver according to claim 6 wherein the noise volume control, responsive to the quality level of all of the counted occurrences of the error signal being higher than a present level of the volume level of the noise, to decrease the volume level of the noise.

8. The digital receiver according to claim 6 wherein the noise volume control, responsive to the quality level of any of the counted occurrences of the error signal being lower than a present level of the volume level of the noise, to increase the volume level of the noise.

9. The digital receiver according to claim 6 wherein the high quality level is a low bit error rate and the low quality level is a high bit error rate.

10. The digital receiver according to claim 5 wherein the noise volume control comprises a volume control state machine.

11. A digital radio telephone comprising:

an antenna;

a transmitter coupled to the antenna;

a controller coupled to the transmitter;

a user interface coupled to the controller; and a receiver coupled to the antenna and the controller, the receiver comprising:

decoding circuitry having an input, a first output and a second output, the input of the decoding circuitry coupled to the antenna to receive a received signal, the first output of the decoding circuitry to provide a speech signal, the second output of the decoding circuitry to provide an error signal indicating a level of quality of the received signal, an adder coupled to the first output of the decoding circuitry and to the controller, a noise source to provide noise, a switch coupled to the adder and the noise source to connect or disconnect the adder and the noise source, and a noise switch control coupled to the second output of the decoding circuitry and the switch, the noise switch control, responsive to the error signal having a level of quality below a predetermined quality threshold, controlling the switch to couple the noise source to the adder for combining with the speech signal and, thereafter, the switch control circuit, responsive to at least two consecutive ones of the error signal having a level of quality above the predetermined quality threshold, controlling the switch to uncouple the noise source from the adder.

12. The digital radio telephone according to claim 11 wherein the receiver further comprises:

a mixer coupled to the noise source and the switch;

a counter coupled to the second output of the decoding circuitry, the counter to count each occurrence of the error signal at a high quality level and at a low quality level for a predetermined number of the error signal and, thereafter, to output counted occurrences of the error signal at the high quality level and at the low quality level; and a noise volume control coupled to the counter and the mixer, responsive to the quality level of all of the counted occurrences of the error signal being higher than a present level of a volume of the noise, outputting a first noise scale factor to the mixer to decrease the volume of the noise, and the noise volume control, responsive to the quality level of any of the counted occurrences of the error signal being lower than the present level of the volume of the noise, outputting a second noise scale factor to the mixer to increase the volume of the noise.

13. A method of generating noise in a digital receiver, the method comprising the steps of:

converting a received signal into a speech signal;

providing an error signal indicative of a quality level of the received signal;

inserting noise into the speech signal when the quality level of a first occurrence of the error signal is below a predetermined quality threshold; and halting, responsive to inserting, inserting noise only when the quality level of a plurality of occurrences of the error signal are above the predetermined quality threshold.

14. The method according to claim 13 wherein the step of inserting further comprises the substep of adding the noise to the speech signal on a first occurrence of the error signal at a low quality level, and the step of halting further comprises the substep of preventing adding the noise to the speech signal after a predetermined number of occurrences of consecutive ones of the error signal at a high quality level.

15. The method according to claim 13 further comprising the steps of:

setting a volume level of the noise, the volume level corresponding to the quality level; and selectively varying, responsive to multiple occurrences of the error signal, the volume level of the noise.

16. The method according to claim 15 wherein the step of selectively varying further comprises the substeps of:

counting a predetermined number of the error signal;

counting, during the step of counting a predetermined number of the error signal, each occurrence of the error signal at one of a high quality level and a low quality level; and counting, during the step of counting a predetermined number of the error signal, each occurrence of the error signal at the other one of the high quality level and the low quality level.

17. The method according to claim 16 wherein the step of selectively varying further comprises the substep of:

increasing, responsive to the steps of counting, the volume level of the noise when any occurrences of the error signal indicate a quality level lower than a present level of the volume level.

18. The method according to claim 16 wherein the step of selectively varying further comprises the substep of:

decreasing, responsive to the steps of counting, the volume level of the noise when all occurrences of the error signal indicate a quality level higher than a present level of the volume level.

19. The method according to claim 13 wherein the step of converting further comprises the substep of decoding the received signal into decoded frames of speech data; and further comprising the steps of:

detecting bit errors in the decoded frames of speech data;

tracking the bit error rate of the decoded frames of speech data; and generating the error signal indicative of the bit error rate.

20. The method according to claim 13 further comprising the step of varying a volume level of the noise according to accumulated counts of the error signal.

* * * * *